US008981792B2

(12) United States Patent
Girlando

(10) Patent No.: US 8,981,792 B2
(45) Date of Patent: Mar. 17, 2015

(54) RFID READABLE DEVICE WITH SMART SURFACE ACCESS

(75) Inventor: Giovanni Girlando, Catania (IT)

(73) Assignee: STMicroelectronics S.R.L., Agrate Brianza (MB) (IT)

(*) Notice: Subject to any disclaimer, the term of this patent is extended or adjusted under 35 U.S.C. 154(b) by 705 days.

(21) Appl. No.: 13/306,142

(22) Filed: Nov. 29, 2011

(65) Prior Publication Data

US 2012/0139557 A1 Jun. 7, 2012

(30) Foreign Application Priority Data

Nov. 30, 2010 (IT) .............................. VA2010A0089

(51) Int. Cl.
G01R 27/04 (2006.01)
G06K 7/00 (2006.01)
H04B 5/00 (2006.01)
H02J 5/00 (2006.01)

(52) U.S. Cl.
CPC ............ H04B 5/0062 (2013.01); H04B 5/0031 (2013.01); H04B 5/0037 (2013.01); H04B 5/0043 (2013.01); H02J 5/005 (2013.01)
USPC .......................................... 324/629; 235/440

(58) Field of Classification Search
CPC ...... H04B 5/00; H04B 5/0031; H04B 5/0037; H04B 5/0043; H04B 5/005; H04B 5/0062; H04B 3/00; H04B 3/46; G06K 7/086; G06K 7/0008; G06F 3/08
USPC ................... 324/629, 600; 235/440, 439, 435
See application file for complete search history.

(56) References Cited

U.S. PATENT DOCUMENTS

| 5,706,250 | A | 1/1998 | Rialan et al. ..................... 367/77 |
| 6,791,452 | B2* | 9/2004 | Fletcher et al. .............. 340/10.6 |
| 7,388,497 | B1* | 6/2008 | Corbett et al. ............. 340/572.4 |
| 7,434,480 | B2* | 10/2008 | Georgeson et al. ...... 73/862.041 |
| 8,459,554 | B2* | 6/2013 | La Rosa et al. ................ 235/440 |
| 2009/0231142 | A1* | 9/2009 | Nikitin et al. .............. 340/572.8 |
| 2010/0116365 | A1* | 5/2010 | McCarty ....................... 137/554 |
| 2010/0198675 | A1* | 8/2010 | Mockli ...................... 705/14.26 |
| 2011/0012713 | A1* | 1/2011 | Wilkinson ................... 340/10.3 |
| 2011/0136470 | A1* | 6/2011 | Kurz ............................. 455/410 |
| 2011/0160548 | A1* | 6/2011 | Forster .......................... 600/301 |

(Continued)

FOREIGN PATENT DOCUMENTS

| WO | 99/60424 | 11/1999 | ............... G01V 1/38 |
| WO | 2009/066951 | 5/2009 | ............... H04B 7/26 |

OTHER PUBLICATIONS

Yang "*Connectionless Indoor Inventory Tracking in Zigbee RFID Sensor Network*" IECON2009—35th Annual Conference of IEEE Industrial Electronics; Nov. 3-5, 2009, pp. 2618-2623.
He "*The ZigBee Wireless Sensor Network in Medical Care Applications*" Computer, Mechatronics, Control and Electronic Engineering (CMCE), 2010 International Conference On, IEEE, Piscataway, NJ; Aug. 24, 2010, pp. 497-500.

*Primary Examiner* — Hoai-An D Nguyen
(74) *Attorney, Agent, or Firm* — Allen, Dyer, Doppelt, Milbrath & Gilchrist, P.A.

(57) ABSTRACT

A monitoring system includes an array of concatenated sensing nodes, with each sensing node being configured to have at least one of near-field and far-field RF coupling circuitry to interface with an adjacent sensing node. A respective device is coupled to each of the sensing nodes. A reader device is configured to have at least one of near-field and far-field RF coupling circuitry to interface with the array of concatenated sensing nodes to read data from the devices.

24 Claims, 11 Drawing Sheets

(56) References Cited

U.S. PATENT DOCUMENTS

2011/0217205 A1* 9/2011 Peeters ............................ 422/69
2012/0079297 A1* 3/2012 Tanizawa et al. .............. 713/310
2012/0206309 A1* 8/2012 Lavedas et al. ................ 343/742

* cited by examiner

US 8,981,792 B2

RFID READABLE DEVICE WITH SMART SURFACE ACCESS

FIELD OF THE INVENTION

The present disclosure relates generally to Radio Frequency Identification Device (RFID) systems, and, in particular, to large surface systems with a mono-dimensional or bi-dimensional array of sensing nodes.

BACKGROUND OF THE INVENTION

There are ongoing projects to devise approaches to monitor for prolonged periods of time, and ideally, even permanently, tag data, physical, chemical and/or geometrical parameter changes that may occur at any spot location over large structures.

Patent application no. VA2010A000018, assigned to the current assignee of the present invention and filed on Feb. 26, 2010, describes a multi-cell flexible sheet of organic polymer construction and having a finite or a theoretically unlimited length. The multi-cell flexible sheet includes a monolithically fabricated array of one or more types of cells having the same or different functionalities (e.g., sensor cells, active pixel cells of a large size display). The cells are juxtaposed to form a multi-cell sheet eventually supported on a flexible film. Such a bi-dimensional "tablecloth" array of self-consistent integrated circuit cells could be cut into pieces to be tailored for the need of the specific application without impairing the operability of all the cells spared by the cutting. This will eventually serve as a magazine of individually severable cells having an autonomous operability.

However, self-consistency of each individual cell follows the conventional approach of a pixel type organization, and is burdensome specially for sensing events that may occur at any location over a relatively large surface of a structure or body to be monitored. Communications with the external board by OLED devices and the embedding of a photovoltaic generator, battery or other energy storing device in each individual cell may be burdensome.

Another application assigned to the current assignee of the present invention, US2009/0033467 discloses a RFID device based on RF energy transfer and/or transmit/receive functions by near-field (magnetic) coupling that may be implemented through a hybrid transformer. A tag device (a sensor eventually coupled to it in a monolithically integrated circuit manner) has a primary inductor that is part of a RF near-field coupling structure for a reader device, and a secondary inductor that is either monolithically integrated on the tag/sensor integrated circuit (IC) or formed on a surface of the IC chip by post-processing (On-Chip-Antenna or OCA).

Near-field coupling of a reader with every tag device of a tablecloth array having a very large number of sensing nodes over a relatively large surface is labor intensive. This may require the reader to sequentially reach and pause momentarily over each node to be monitored, at a relatively short distance from it, to establish the necessary near-field RF magnetic coupling conditions.

SUMMARY OF THE INVENTION

In view of the foregoing background, an object of the present invention is to monitor a plurality of sensing nodes substantially in a RFID-mode by coupling a reader to any one sensing node of a line of or of a bi-dimensional tablecloth array of sensing nodes, either uniformly or non-uniformly spaced. The nodes lay over a surface of a structure to be monitored, for example, near an edge or at any location that is easy to access (to get close to it) by an external reader device.

This objective may be achieved by a RF coupling architecture wherein a RFID coupling for gathering data from any and all sensing nodes may take place in a plurality of modes, namely:
1) only by near-field (magnetic) coupling;
2) only by far-field (electromagnetic) coupling;
3) both by near-field and far-field couplings.

The mode depends on the contemplated application.

In case the RF coupling takes place only by near-field coupling, then such a coupling may be implemented between any sensing node of what may be defined as a smart surface RFID network (a Smart Surface) and the reader.

In case simple tag devices are coupled to the sensing nodes, a RFID surface device is implemented, whereby the tag devices are energized by the reader. If the sensing nodes are coupled to active self-powered sensor/actuator devices, then a "surface sensor network" device is implemented. In this case the smart surface RFID network may have a main requirement of minimizing power losses along the data transfer paths between any sensing node and the reader. If the sensing nodes are coupled in part passive tags/passive sensors and in part active sensors and/or actuators, then the smart surface RFID network will serve for exchanging data among the sensing nodes and between the active sensors/actuators and the reader, as well as for powering the passive tags and passive sensors.

BRIEF DESCRIPTION OF THE DRAWINGS

The peculiarities of the article of manufacture will now be highlighted in the following description of exemplary embodiments. Reference will be made to the attached drawings, which are not intended to limit the scope of the claimed invention. The illustrated examples as provided below are for an easier comprehension.

DETAILED DESCRIPTION OF THE PREFERRED EMBODIMENTS

Figure 1:
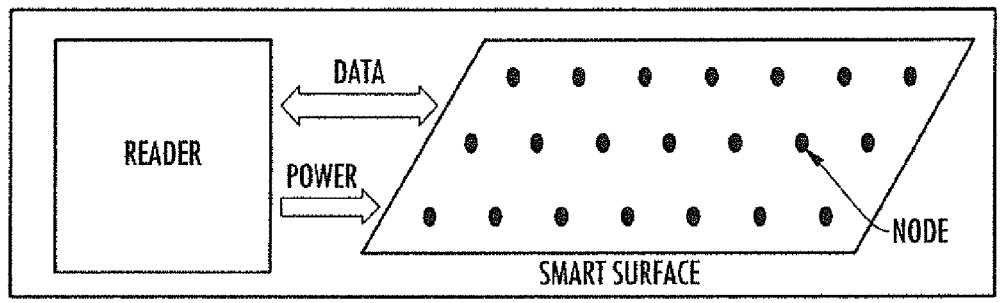
FIG. 1 is an exemplary scheme of a near-field and/or far-field RF accessible multi-node surface monitoring device according to the present invention.

FIG. 1 is an exemplary scheme of a near-field and/or far-field RF accessible multi-node surface monitoring device. The array has a plurality of sensing nodes that may be uniformly spaced as depicted, or may have any kind of distribution over the surface according to the monitoring needs. The reader device is typically a remote unit that may be fixed or mobile.

Figure 2:
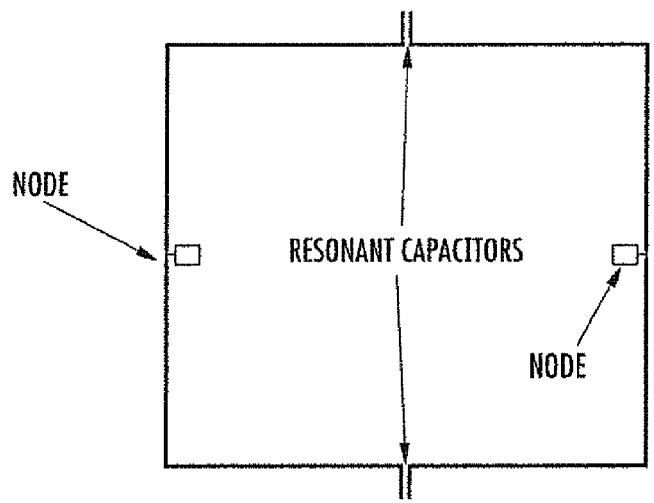
FIGS. 2 and 3 are a basic layout and the equivalent circuit, respectively, of an RF coupling structure between two adjacent nodes of a multi-node surface monitoring device according to the present invention.
Figure 3:
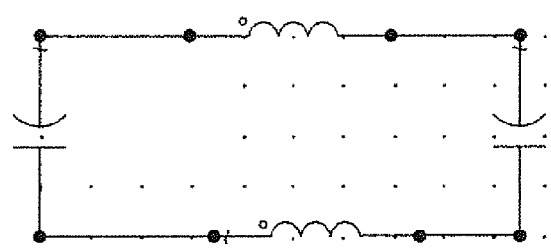

FIGS. 2 and 3 are a basic layout and the equivalent circuit, respectively, of a RF coupling structure between two adjacent nodes of a multi-node surface monitoring device. The RF coupling structure may, for example, be realized in any of the forms extensively described in great detail in patent application no. US2009/0033467, which is assigned to the assignee of the present invention and the entire contents of which are incorporated by reference. Of course, other specifically developed more effective near-field and far-field RF coupling structures may be used to implement a bi-dimensional smart surface coupling network, as will be described in the ensuing description of several exemplary embodiments.

Figure 4:
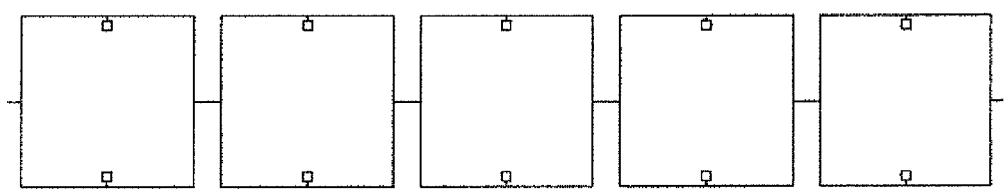
FIGS. 4 and 5 are a basic layout and the equivalent circuit, respectively, of concatenated RF couplings of a line of sensing nodes along one direction among a plurality of directions for covering a tablecloth bi-dimensional array of sensing nodes to be accessed by a reader according to the present invention.
Figure 5:
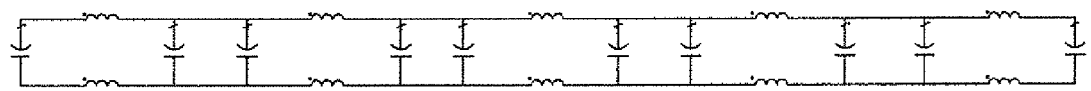
Figure 6:
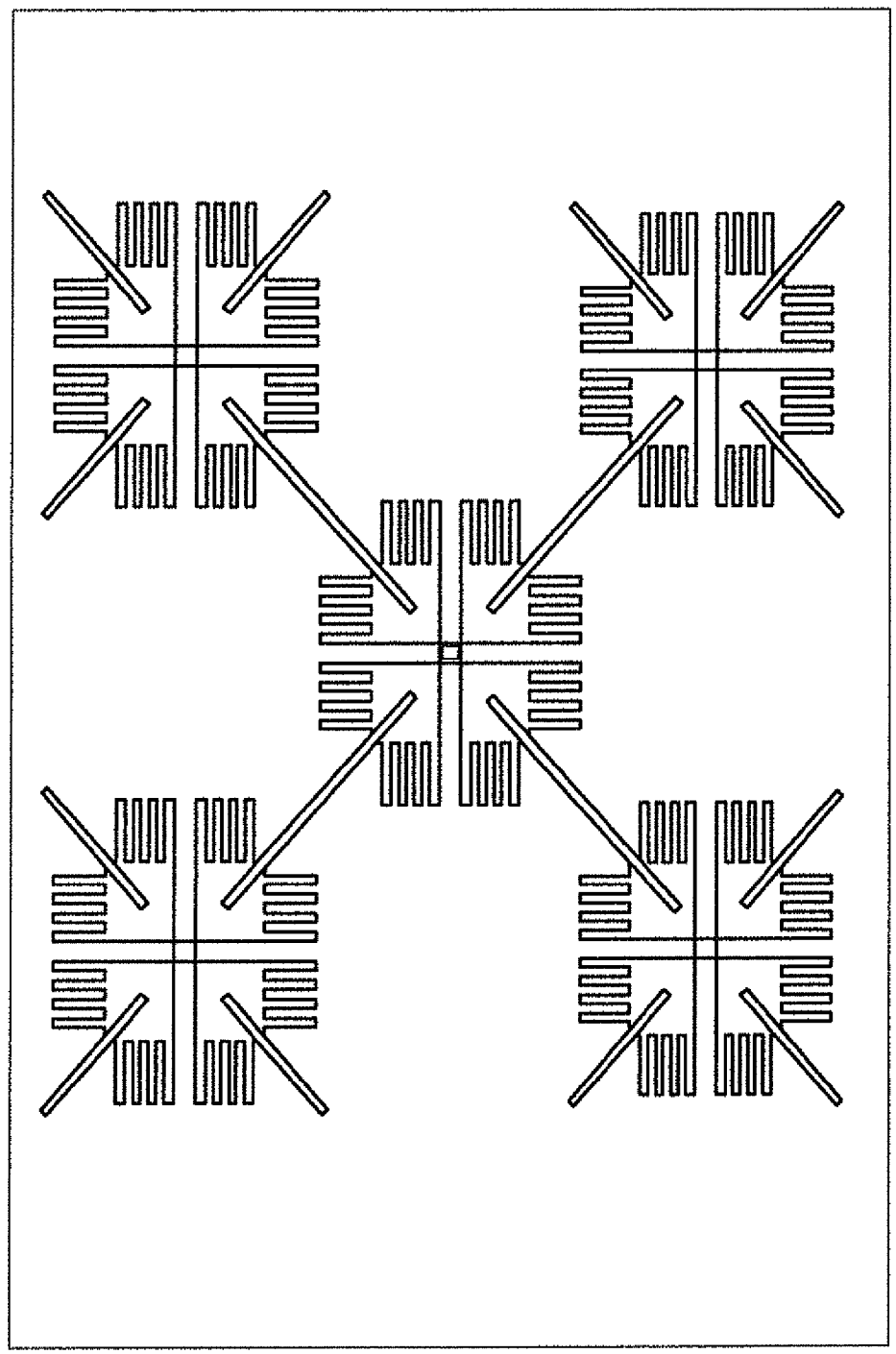
FIGS. 6, 7, 8 and 9 illustrate an exemplary embodiment of a smart surface based on near-field concatenated RF coupling among sensing nodes of a multi-node surface monitoring device according to the present invention.

FIGS. 4 and 5 are a basic layout and the equivalent circuit, respectively, of concatenated RF couplings of a line of sensing nodes along one direction among a plurality of directions for covering a tablecloth bi-dimensional array of sensing nodes to be accessed by a reader.

FIGS. 6, 7, 8 and 9 illustrate an exemplary embodiment of a smart surface based on concatenated near-field RF coupling among adjacent sensing nodes of a multi-node surface monitoring device.

Figure 7:
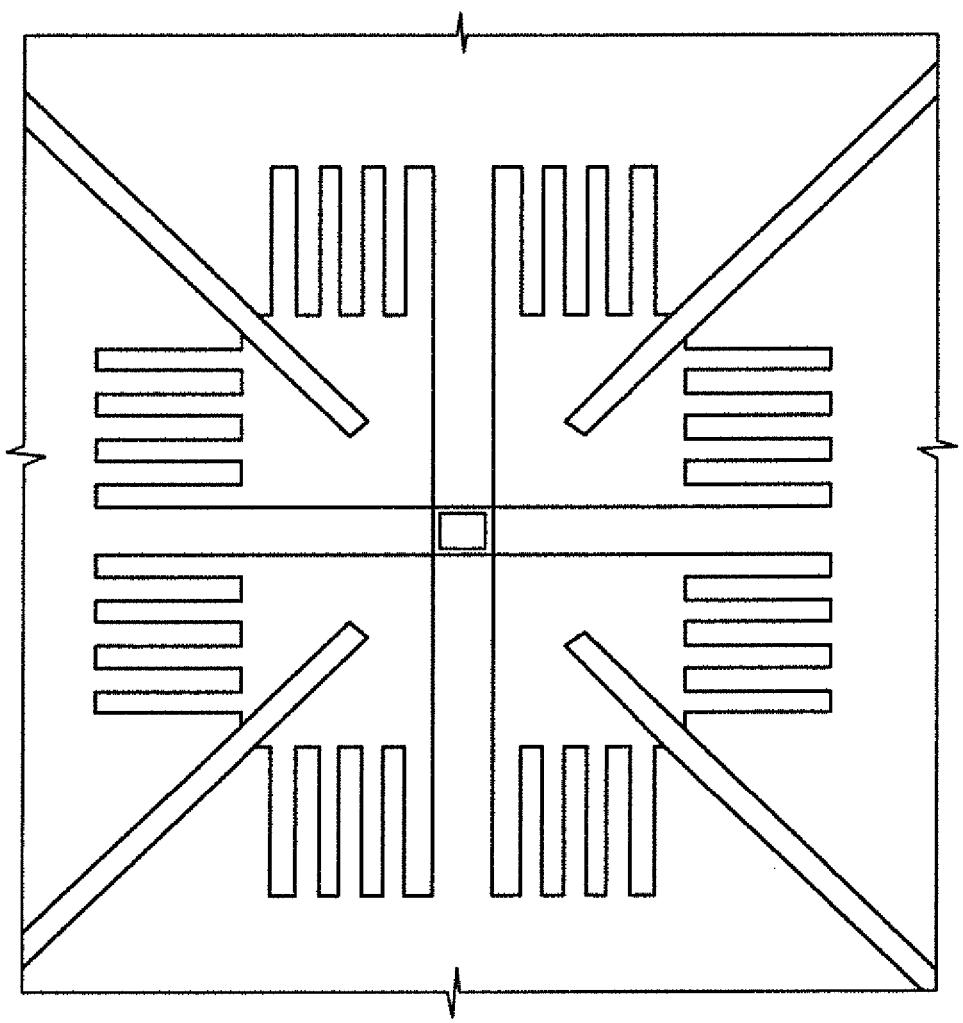
Figure 8:
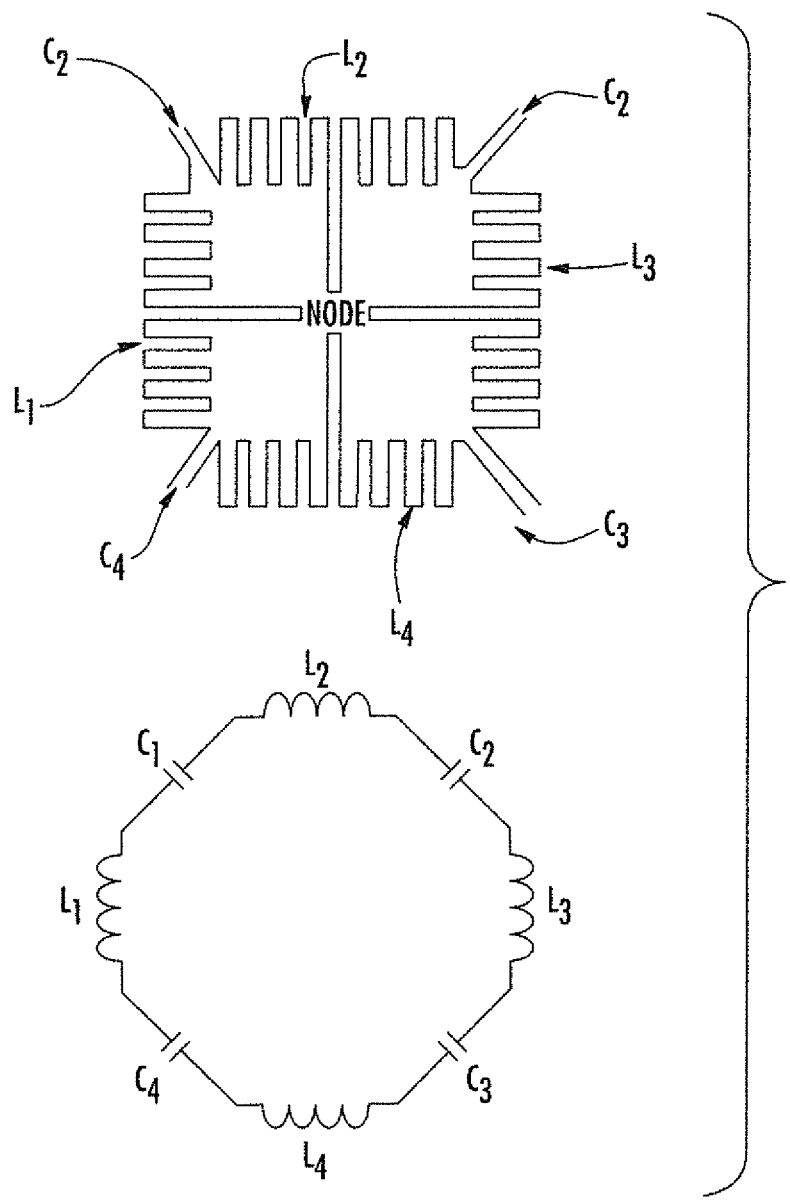

As may be better observed in the enlargement of FIG. 7 and in the layout of FIG. 8, the four inductors L1-L4 of the equivalent circuit are made with zig-zag lines. This avoids creation of radiation resistances that would be detrimental for a near-field (magnetic coupling) embodiment.

In the layout enlargement of FIG. 7, it may also be observed the site of the sensing node where the coupling with a tag circuit or sensor is established.

Figure 10:
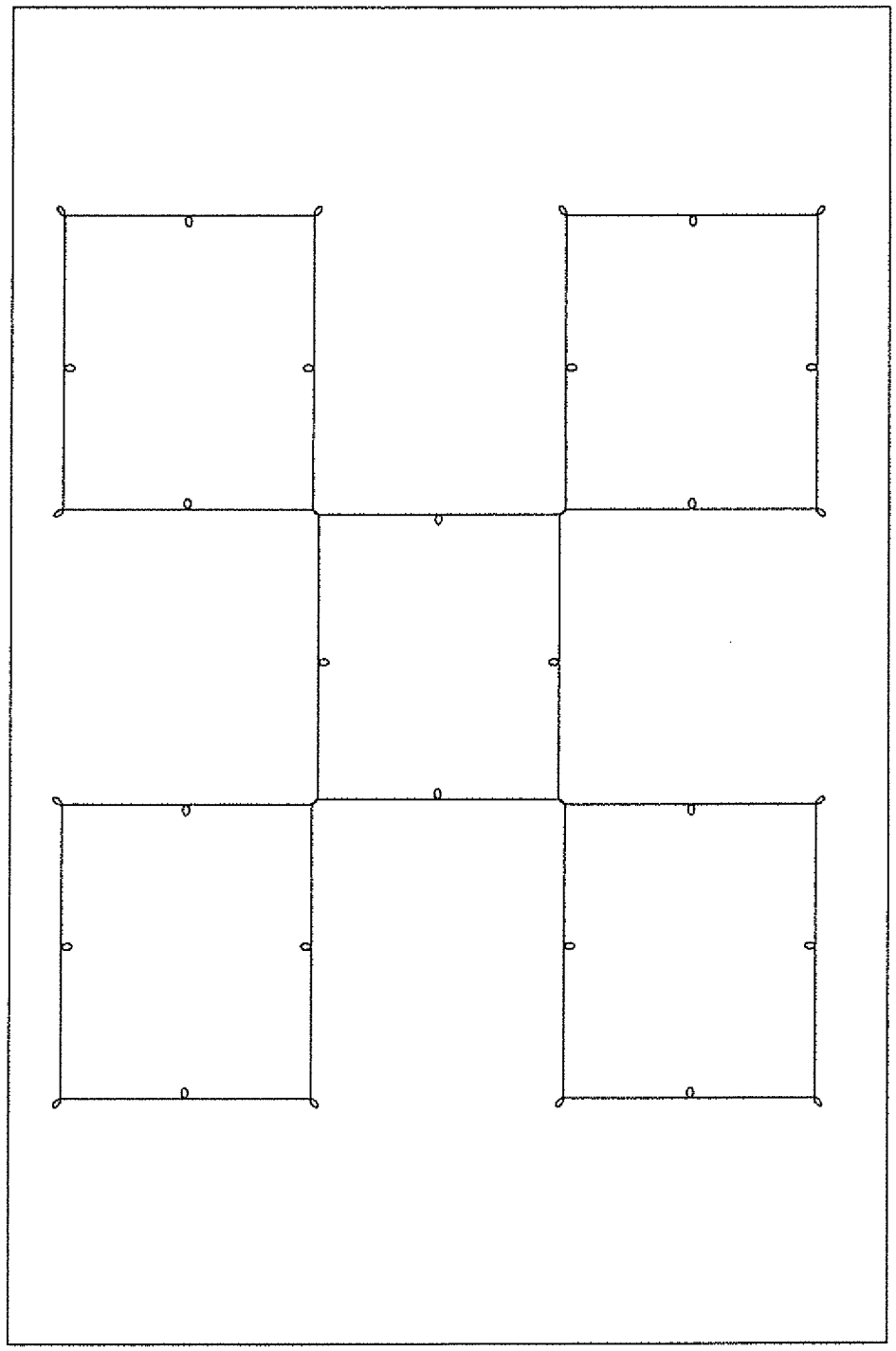
FIGS. 10, 11 and 12 illustrate another exemplary embodiment of a smart surface adapted to function with near-field or far-field concatenated RF coupling among sensing nodes of a multi-node surface monitoring device according to the present invention.
Figure 11:
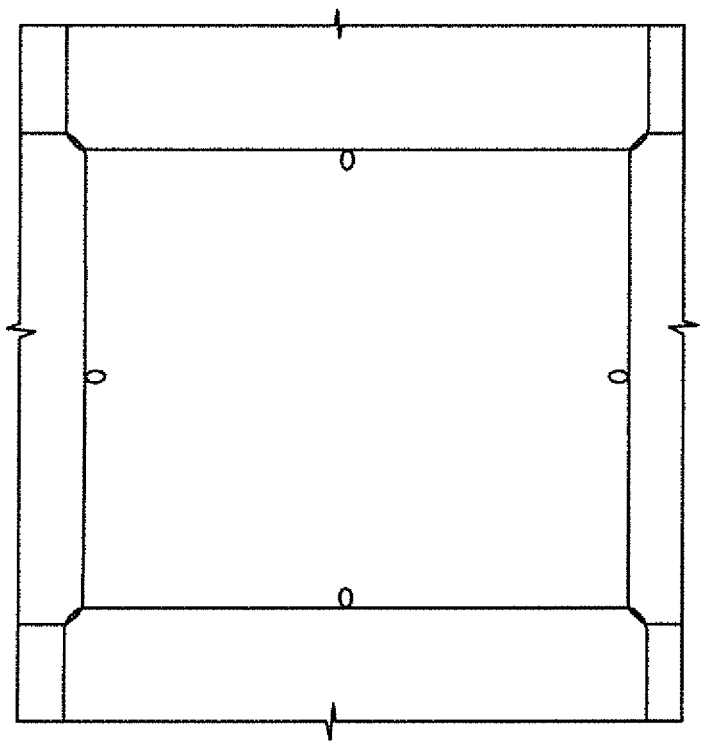
Figure 12:
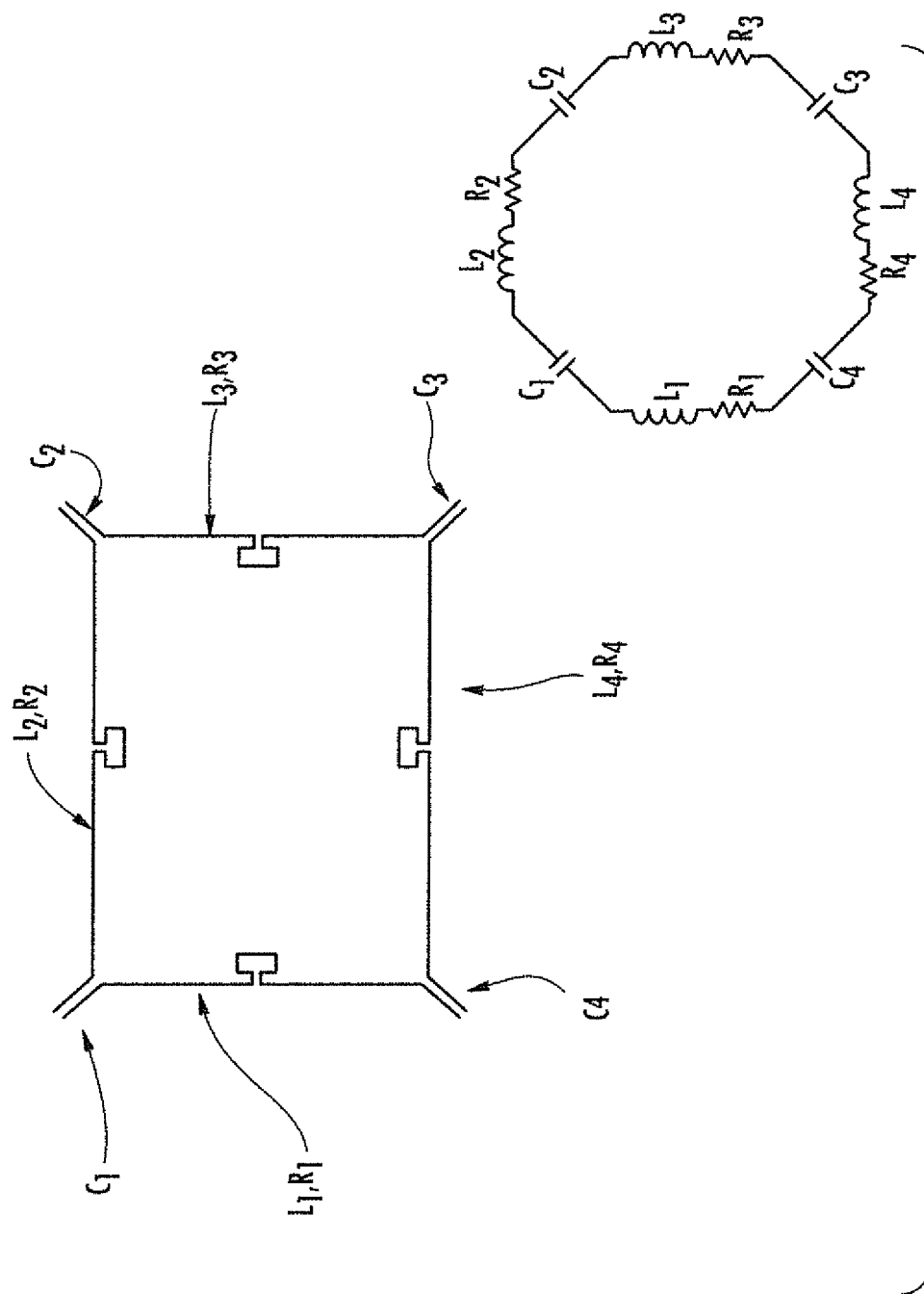

Differently, in case of an embodiment of the smart surface network designed for supporting both near-field and far-field coupling modes, depicted in FIGS. 10, 11 and 12, there are resistors R1-R4 in the elementary RF coupling structure which are radiation resistances, which are adapt to provide a good far field electromagnetic coupling with the reader.

Figure 9:
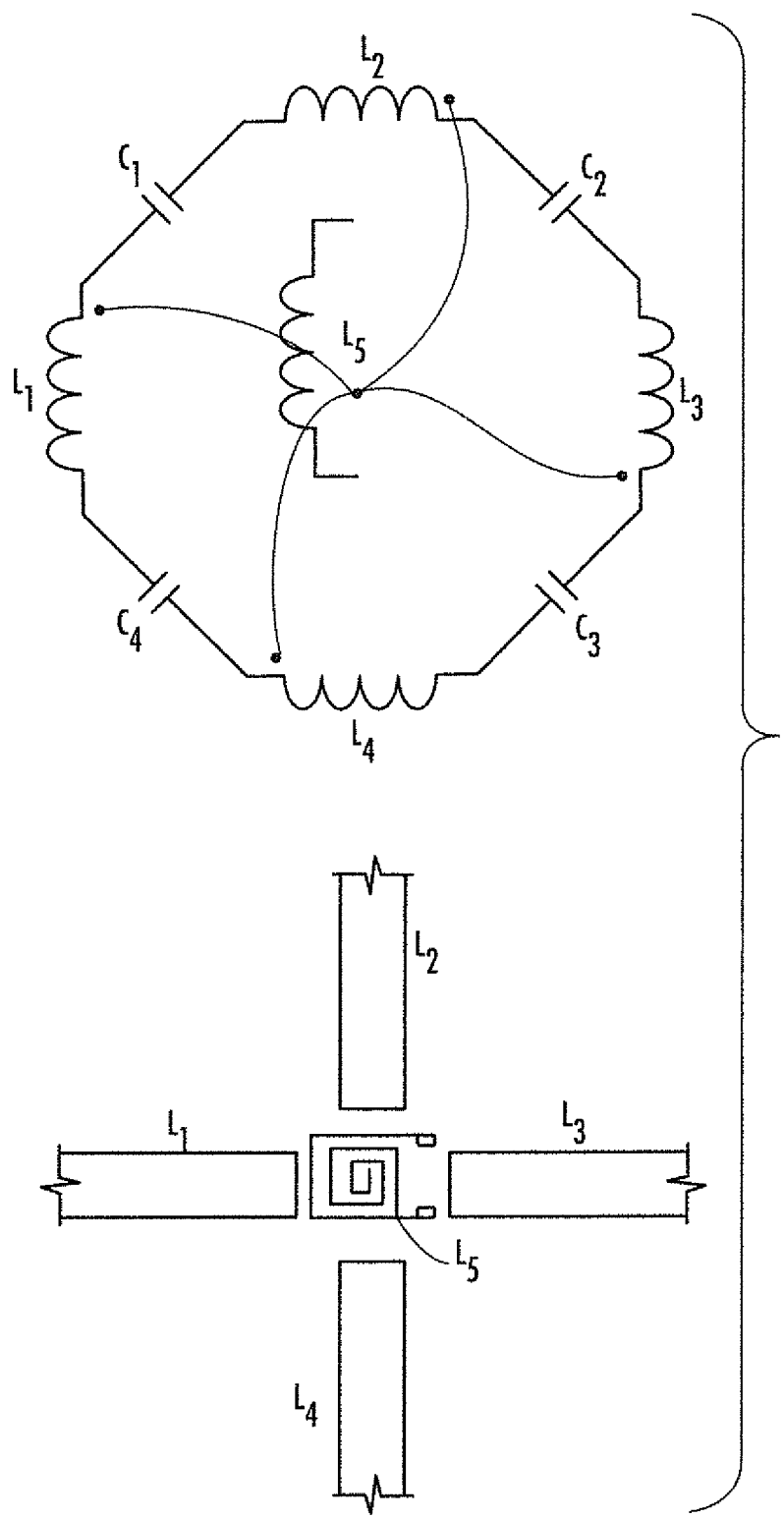

FIG. 9 is a schematic equivalent circuit illustrating a possible way of coupling the tag circuit or sensor to the sensing node of the concatenated RF coupling surface structure (smart surface).

The near-field inductive coupling through a hybrid transformer between a tract of each of the four inductors L1, L2, L3 and L4 of an elementary structure of RF coupling of the smart surface and a secondary inductor that may be integrated in the IC tag and/or sensor chip or formed onto the IC chip by post-processing, is implemented at the center of the elementary structure (i.e., the so-called sensing node).

FIGS. 10, 11 and 12 illustrate another exemplary embodiment of a smart surface adapted to function with near-field or far-field concatenated RF coupling among an innumerable or large number of sensing nodes of the so-called smart surface RF coupling network.

As may be better observed in the enlargement of FIG. 11, in an elementary RF coupling structure adapted for near-field as well as for far-field (electromagnetic) coupling with the reader device, the so-called sensing nodes for coupling tags and/or sensors are four and precisely in correspondence with the four small loops formed at the middle of each side of the pseudo-square elementary RF coupling structure, as more easily recognized by observing the schematic layout and equivalent circuit elementary depicted in the hand sketches of FIG. 12.

Figure 13:
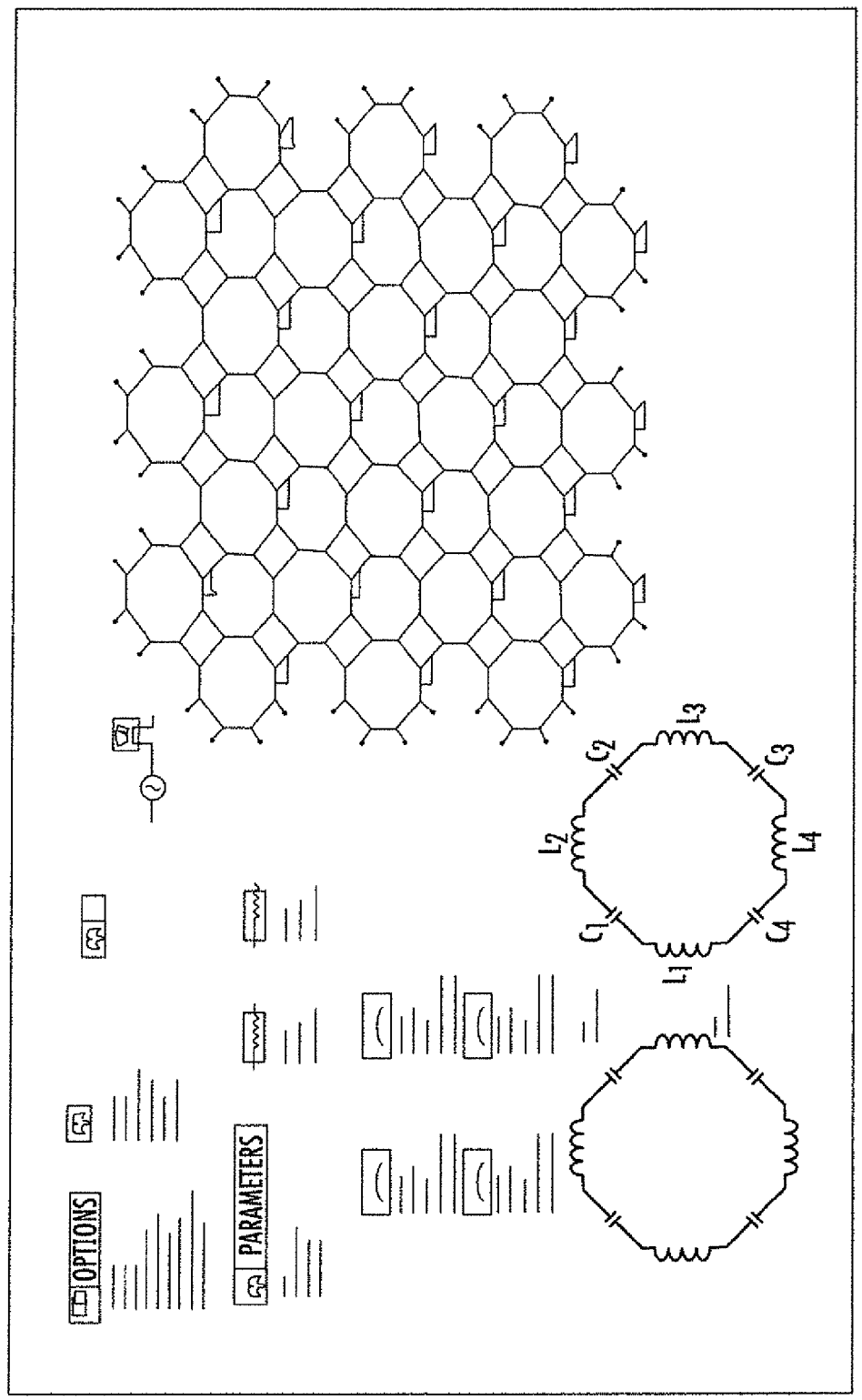
FIG. 13 is a modeled layout of a multi-node RFID accessible smart surface monitoring device according to the present invention.

A modeled layout of a RF coupling surface network (smart surface) of this disclosure is depicted in FIG. 13.

Figure 14:
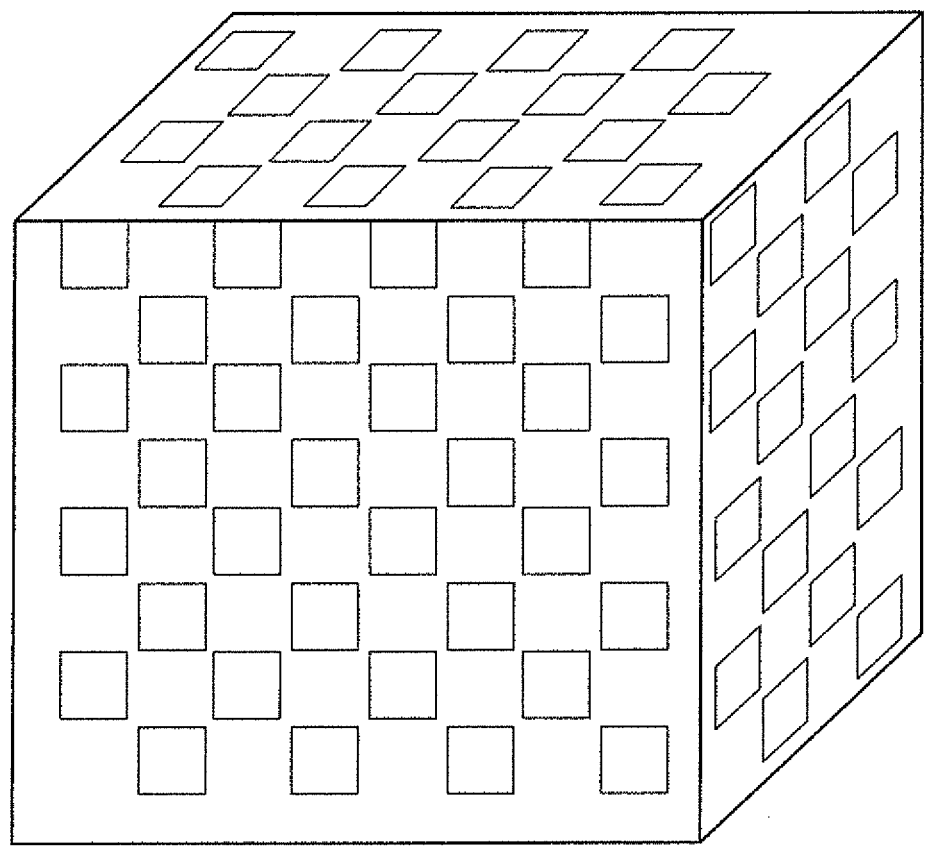
FIG. 14 is a graphical schematic representation of a generic object or structure entirely wrapped in a multi-node RFID accessible smart surface monitoring device according to the present invention.

FIG. 14 is a graphical schematic representation of a generic object or structure wholly or entirely wrapped in a multi-node RFID monitoring device accessible through a concatenated near-field or far-field smart surface structure.

Of course, known anti-collision algorithms will normally be software-implemented in the reader to recognize the spot of origin of the gathered data over an extended surface, that is, to a sensing node of the multi-node smart surface RF coupling network.

That which is claimed:

1. A monitoring system comprising:
   an array of concatenated sensing nodes, with each sensing node being configured to have at least one of near-field and far-field RF coupling circuitry to interface with an adjacent sensing node;
   with each node comprising a plurality of inductors and a plurality of capacitors, and with at least one of said plurality of capacitors being coupled to an adjacent node;
   a respective device coupled to each of said sensing nodes; and
   a reader device configured to have at least one of near-field and far-field RF coupling circuitry to interface with said array of concatenated sensing nodes to read data from said devices.

2. The monitoring system of claim 1, wherein each device comprises a tag.

3. The monitoring system of claim 1, wherein each device comprises a sensor.

4. The monitoring system of claim 1, wherein said array of concatenated sensing nodes is configured so that data transfer therethrough is based on near-field RF coupling.

5. The monitoring system of claim 1, wherein said array of concatenated sensing nodes is configured so that data transfer therethrough is based on far-field RF coupling.

6. The monitoring system of claim 1, wherein said array of concatenated sensing nodes is configured so that data transfer therethrough is based on both near-field RF coupling and far-field RF coupling.

7. The monitoring system of claim 1, wherein each device comprises a passive sensor; and wherein said reader device is configured to power said passive sensors based on near-field coupling.

8. The monitoring system of claim 7, wherein each passive sensor includes an identification and data exchange function that is powered by said reader device, with said reader device reading the data directly from said passive sensor providing the data to be read.

9. The monitoring system of claim 7, wherein each passive sensor includes an identification and data exchange function that is powered by said reader device, with said reader device reading the data indirectly from said passive sensor providing the data to be read.

10. The monitoring system of claim 1, wherein each device comprises an active sensor that is self-powered; and wherein said reader device is configured to transfer data to or receive data from each sensor.

11. The monitoring system of claim 10, wherein each active sensor is coupled to a corresponding sensing node via both near-field RF coupling and far-field RF coupling.

12. A surface monitoring system comprising:
- an array of concatenated sensing nodes, with each sensing node being configured to have at least one of near-field and far-field RF coupling circuitry to interface with an adjacent sensing node;
- with each node comprising a plurality of inductors and a plurality of capacitors, and with at least one of said plurality of capacitors being coupled to an adjacent node; and
- a respective device coupled to each of said sensing nodes.

13. The surface monitoring system of claim 12, wherein each device comprises at least one of a tag and a sensor.

14. The surface monitoring system of claim 12, wherein said array of concatenated sensing nodes is configured so that data transfer therethrough is based on near-field RF coupling.

15. The surface monitoring system of claim 12, wherein said array of concatenated sensing nodes is configured so that data transfer therethrough is based on far-field RF coupling.

16. The surface monitoring system of claim 12, wherein said array of concatenated sensing nodes is configured so that data transfer therethrough is based on both near-field RF coupling and far-field RF coupling.

17. A method of operating a monitoring system comprising;
- providing an array of concatenated sensing nodes, with each sensing node being configured to have at least one of near-field and far-field RF coupling circuitry to interface with an adjacent sensing node;
- with each node comprising a plurality of inductors and a plurality of capacitors, and with at least one of the plurality of capacitors being coupled to an adjacent node;
- providing a respective device coupled to each of the sensing nodes; and
- providing a reader device configured to have at least one of near-field and far-field RF coupling circuitry to interface with the array of concatenated sensing nodes to read data from the devices.

18. The method of claim 17, wherein each device comprises a tag.

19. The method of claim 17, wherein each device comprises a sensor.

20. The method of claim 17, wherein the array of concatenated sensing nodes is configured so that data transfer therethrough is based on near-field RF coupling.

21. The method of claim 17, wherein the array of concatenated sensing nodes is configured so that data transfer therethrough is based on far-field RF coupling.

22. The method of claim 17, wherein the array of concatenated sensing nodes is configured so that data transfer therethrough is based on both near-field RF coupling and far-field RF coupling.

23. The method of claim 17, wherein each device comprises a passive sensor; and wherein the reader device is configured to power the passive sensors based on near-field coupling.

24. The method of claim 17, wherein each device comprises an active sensor that is self-powered; and wherein the reader device is configured to transfer data to or receive data from each sensor.

* * * * *